United States Patent [19]
Datta

[11] Patent Number: 5,671,422
[45] Date of Patent: Sep. 23, 1997

[54] METHOD AND APPARATUS FOR SWITCHING BETWEEN THE MODES OF A PROCESSOR

[75] Inventor: Sham M. Datta, Hillsboro, Oreg.

[73] Assignee: Intel Corporation, Santa Clara, Calif.

[21] Appl. No.: 411,450

[22] Filed: Mar. 28, 1995

Related U.S. Application Data

[63] Continuation-in-part of Ser. No. 339,471, Nov. 14, 1994, abandoned.

[51] Int. Cl.$^6$ ...................................................... G06F 9/00
[52] U.S. Cl. ............................................. 395/734; 395/739
[58] Field of Search ................................. 395/800, 734, 395/739

[56] References Cited

U.S. PATENT DOCUMENTS

| | | | |
|---|---|---|---|
| 4,488,227 | 12/1984 | Miu et al. | 364/200 |
| 5,291,585 | 3/1994 | Sato | 395/500 |
| 5,291,604 | 3/1994 | Kardach | 395/725 |
| 5,303,378 | 4/1994 | Cohen | 395/700 |
| 5,355,490 | 10/1994 | Kou | 395/700 |
| 5,357,628 | 10/1994 | Yuen | 395/575 |
| 5,437,039 | 7/1995 | Yuen | 395/725 |
| 5,481,719 | 1/1996 | Ackerman et al. | 395/700 |
| 5,497,494 | 3/1996 | Combs | 395/750 |
| 5,509,139 | 4/1996 | Ayash | 395/869 |
| 5,511,202 | 4/1996 | Combs | 395/750 |
| 5,535,397 | 7/1996 | Durante | 395/734 |
| 5,537,656 | 7/1996 | Mozdzen | 395/750 |
| 5,594,905 | 1/1997 | Mital | 395/739 |
| 5,623,673 | 4/1997 | Gephardt | 395/733 |

OTHER PUBLICATIONS

Yuen, Desmond, Titled *Intel's SL Architecture, Designing Portable Applications*, Publisher McGraw-Hill, Inc., 1993, pp. 31–53.

*Intel486™ SL Microprocessor Superset Programmer's Reference Manual*, Intel Corporation 1992, pp. 6-1–6-56.

Kane, Gerry and Joe Heinrich, *MIPS RISC Architecture*, Publisher Prentice-Hall, Inc., 1992, Chapters 4 and 6.

*Primary Examiner*—Eric Coleman
*Attorney, Agent, or Firm*—Blakely, Sokoloff, Taylor & Zafman

[57] ABSTRACT

A method for switching between a first mode and a second mode of a processor is provided. According to one embodiment of the invention, a computer system includes the processor coupled to a storage device storing a number of instructions. In response to a first interrupt, a first information is stored in the storage device for switching to processing in the first mode starting at a first of the number of instructions. In response to a second interrupt occurring subsequent to the storing of the first information, said processor switches from processing in the first mode to processing in the second mode. Also in response to the second interrupt, a second information is storm in the storage device for returning to processing in the first mode starting at a second of the number of instructions. In response to said processor switching from said first mode to said second mode, said processor switches from processing in the second mode to processing in the first mode starting at the first instruction using the first information if processing starting at the first instruction is required.

34 Claims, 5 Drawing Sheets

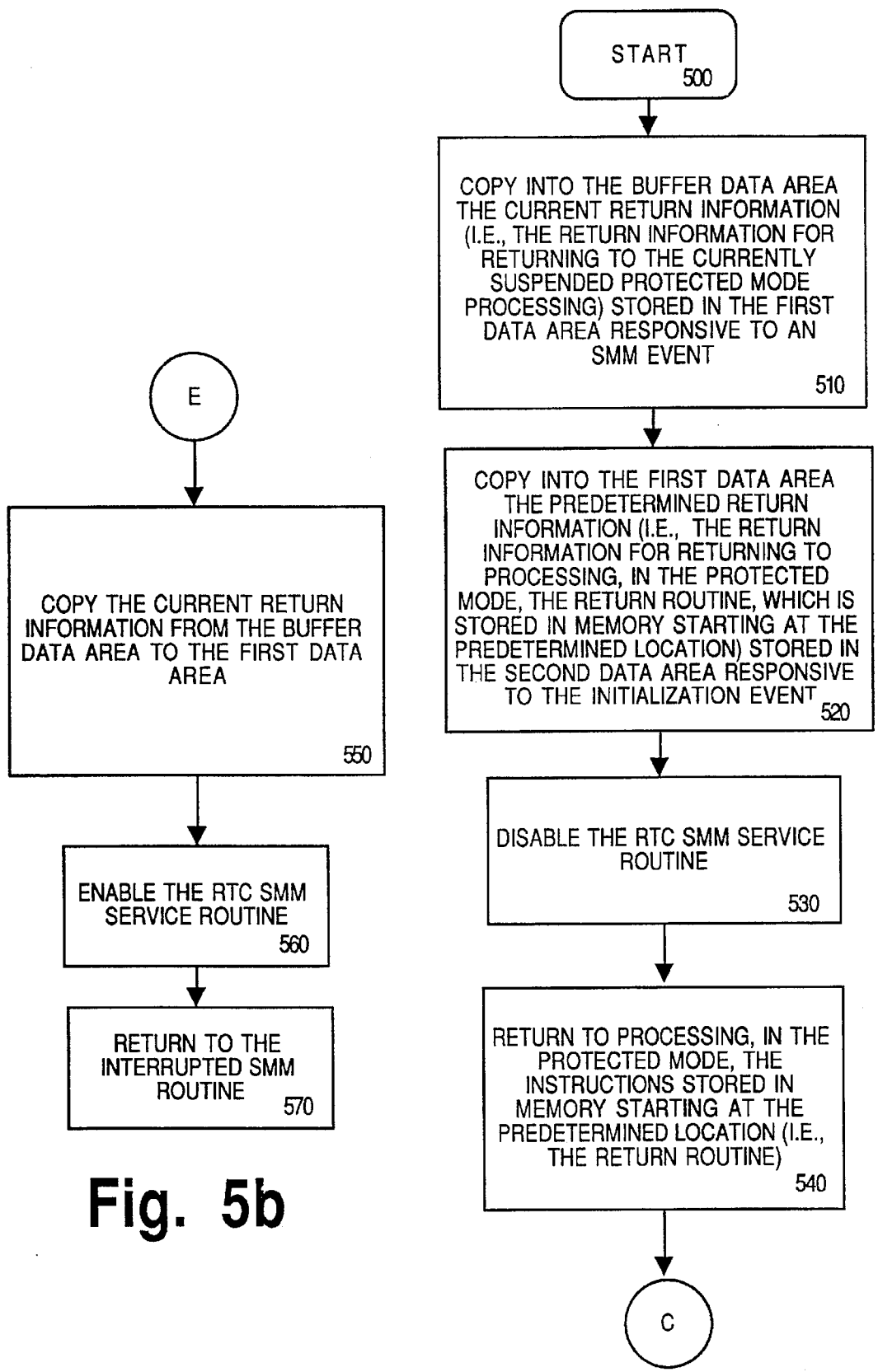

METHOD AND APPARATUS FOR SWITCHING BETWEEN THE MODES OF A PROCESSOR

CROSS-REFERENCES TO RELATED APPLICATIONS

This a continuation-in-part of application Ser. No. 08/339,471, filed Nov. 14, 1994.

BACKGROUND OF THE INVENTION

1. Field of the Invention

The invention relates to the field of computer systems. More specifically, the invention relates to the area of switching between modes of a processor.

2. Background Information

Typical computer systems contain a processor that may function in a number of different modes, each mode providing different resources. For example, Intel® 486SL microprocessor (manufactured by Intel Corporation of Santa Clara, Calif.) operates in a number of different modes, including a protected mode and a system management mode (herein referred to as "SMM mode"). The protected mode is used for the normal execution of programs, including the operating system. In contrast, the SMM mode is used for executing routines that need to be executed in an environment which is transparent to the operating system. Such routines include, for example, certain power management routines.

To provide the transparent environment of the SMM mode, the processor's memory address space includes an SMM memory address space (referred to herein as the "SMM memory area") and a protected mode address space (referred to herein as the "protected mode memory area"). While the SMM memory area is accessible only while the processor is in the SMM mode, the protected mode memory area is accessible in both the protected mode and the SMM mode (with the exception of a small portion which is inaccessible in the SMM mode). However, to use a portion of the protected mode memory area in the SMM mode, any protected mode data stored in that portion must be preserved by temporarily storing it in the SMM memory area. In addition, that protected mode data must be copied back into that portion of the protected mode memory area prior to returning to the protected mode.

The protected mode and the SMM mode also utilize different event handling mechanisms. The SMM event handling mechanism includes an interrupt table starting at a predetermined location in the common memory (i.e., that portion of the protected mode memory area accessible while operating in either SMM or protected mode). Each type of interrupt is assigned an entry in the interrupt table in which the address of its corresponding service routine is stored. In response to an interrupt, the processor accesses the interrupt's entry in the interrupt table to locate its corresponding service routine. Since the SMM interrupt table is located in the common memory area, the use of its entries requires the preservation of the protected mode data located there as described in the preceding paragraph. For example, if the first entry of the interrupt table will be used while in the SMM mode, the protected mode data stored in the protected mode memory area at the address of that entry is temporarily stored in the SMM memory area when entering the SMM mode. In addition, this protected mode data is restored to that location in the common memory prior to returning to the protected mode.

Switching between protected mode and SMM mode is performed in the following manner. The processor enters the SMM mode responsive to an SMI# signal (herein referred to as the "SMM event") which can be generated by either hardware or software. SMM events are recognized on instruction execution boundaries. An SMM event causes the processor to suspend processing in the protected mode at the next instruction of the process currently being executed, switch to the SMM mode, and store the necessary information (herein referred to as "return information") to resume the suspended processing in the protected mode. The return information is stored in a first data area (commonly referred to as the "dump space") contained in the SMM memory area and includes, for example, the following: 1) the contents of the processor's working registers at the instant the first routine was suspended, 2) the location in memory of the next instruction to be executed (the address of which is identified by what is commonly referred to as the instruction pointer), and 3) the machine state information which includes several internal variables in the processor that are necessary in order to resume execution of the suspended routine. The processor then begins execution of the SMM routine that is also stored in the SMM memory area.

Upon completing the required tasks in the SMM mode, the SMM routine concludes with a resume command (e.g., "RSM"). The resume command causes the processor to use the return information in the first data area to resume processing in the protected mode at the instruction where the protected mode processing was interrupted. SMM events may be caused by various stimuli, including, for example, the closing of the lid of a portable computer, the elapsing of a period of time with no activity, etc. As a result, SMM events may occur at any point while processing in the protected mode—i.e., independent of the protected mode processing. In addition, each SMM event causes the processor to write over the previous SMM event's return information stored in the first data area with new return information.

In the prior an method described above, the processor does not return to the protected mode to process instructions stored in memory at a location other than at the location in memory where the protected mode processing was interrupted. According to this prior an method, routines executed in the SMM mode(i.e., the SMM routine) lack the ability to cause the processor to temporarily switch to protected mode to utilize the protected mode's resources and then return to the SMM mode—i.e., SMM events often occur independent of protected mode processing. This creates a variety of problems. For example, the protected mode's event handling mechanism cannot be utilized while in the SMM. Thus, events received while in the SMM mode which must be serviced by the protected mode's event handling mechanism (referred to herein as "protected mode events") cannot be serviced until the processor returns to the protected mode. As a result, these events may be lost if the processor remains in the SMM mode for a long period of time. For example, if a computer connected to a network does not perform any activity for a period of time, the network will ping the computer to see if it is still connected. If the computer responds to the ping, the network does not disconnect the computer. However, if the computer does not respond, the network disconnects the computer. The computer responds to the ping using the protected mode's event handling mechanism. However, if the computer switches to SMM to conserve power, the protected mode's event handling mechanism is not available and the computer will be undesirably disconnected from the network.

One prior art method of returning to the protected mode to process instructions stored in memory at a location other than where the protected mode processing was suspended is to alter the return information which was stored when the protected mode processing was suspended. However, the return information is processor model and mode specific. As a result, this solution lacks compatibility with the general processor family. Additionally, because of the large number of variables and potential states of today's microprocessors, it is very difficult to properly alter the return information.

SUMMARY OF THE INVENTION

A method for switching between a first mode and a second mode of a processor is provided. According to one embodiment of the invention, a computer system includes the processor coupled to a storage device storing a number of instructions. In response to a first interrupt, a first information is stored in the storage device for switching to processing in the first mode starting at a first instruction. In response to a second interrupt occurring subsequent to the storing of the first information, the processor switches from processing in the first mode to processing in the second mode. Also in response to the second interrupt, a second information is stored in the storage device for returning to processing in the first mode starting at a second instruction. In response to the processor switching from the first mode to the second mode, the processor switches from processing in the second mode to processing in the first mode starting at the first instruction using the first information if processing starting at the first instruction is required.

According to another aspect of the invention, a computer system including a processor capable of switching between a first mode and a second mode is provided. In addition to the processor, the computer system includes a storage device coupled to the processor and stores a number of instructions. The instructions embody logic for causing the processor to store a first information in the storage device for switching to processing in the first mode starting at a first instruction. In response to a first interrupt occurring subsequent to the processor storing the first information, the processor switches from processing in the first mode to processing in the second mode and stores a second information in the storage device for returning to processing in the first mode starting at a second instruction. The instructions further embody logic for causing the processor, in response to the processor switching from processing in the first mode to processing in the second mode, to switch from processing in the second mode to processing in the first mode starting at the first instruction using the first information if processing starting at the first instruction is required.

BRIEF DESCRIPTION OF THE DRAWINGS

The invention may best be understood by referring to the following description and accompanying drawings which illustrate the invention. In the drawings:

FIG. 5a illustrates a portion of a flow diagram of RTC SMM service routine 190 according to one embodiment of the invention; and FIG. 5b illustrates the remainder of a flow diagram of RTC SMM service routine 190 according to one embodiment of the invention.

DETAILED DESCRIPTION

A method and apparatus for switching between the modes of a processor is described. In the following description, numerous specific details are set forth to provide a thorough understanding of the invention. However, it is understood that the invention may be practiced without these specific details. In other instances, well-known circuits, structures and techniques have not been shown in detail in order not to unnecessarily obscure the invention.

It is worthwhile to note that the term "event" is used herein to refer to any action or occurrence to which a computer system might respond, such interrupts (hardware and software), exceptions (faults, traps, and aborts), machine checks, debug events, etc.

One Embodiment of the Invention

Figure 1:
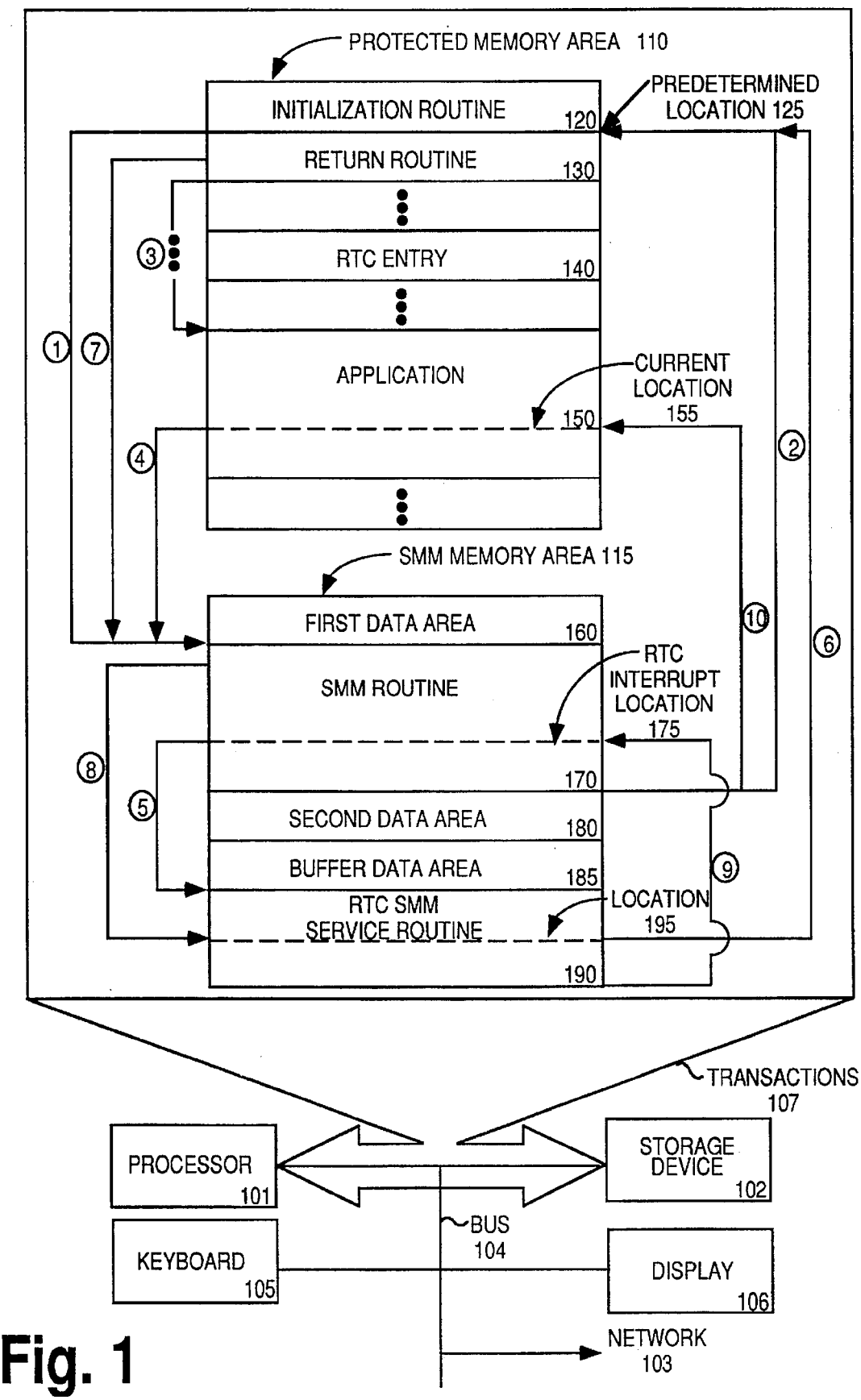
FIG. 1 shows a block diagram illustrating an exemplary computer system 100 incorporating the teachings of the invention.

FIG. 1 shows a block diagram illustrating an exemplary computer system 100 incorporating the teachings of the invention. The exemplary computer system includes a processor 101, a storage device 102, a network 103, and a bus 104. Processor 101 is coupled to storage device 102 and network 103 by bus 104. In addition, a number of user input/output devices, such as a keyboard 105 and a display 106, are also coupled to bus 104. One embodiment of the invention is described in which processor 101 is an Intel® 486SL microprocessor. However, alternative embodiment of the invention may be used in a number of different processors and the invention is in no way limited to this embodiment. For example, the invention could be used in any processor operable in a first mode and a second mode. Thus, the processor may be of any type of architecture, including a CISC or RISC type architecture. Storage device 102 represents one or more mechanisms for storing data. For example, storage device 102 may include read only memory (ROM), random access memory (RAM), magnetic disk storage mediums, optical storage mediums, flash memory devices, etc. While one embodiment will be described in which the invention is implemented in a single processor computer system, the invention could be implemented in a multi-processor computer system.

FIG. 1 emphasizes transactions 107 between processor 101 and storage device 102 to represent the elements and an overview of the operation of one embodiment of the invention, while FIGS. 2, 3, 4, 5a, and 5b illustrate flow diagrams for the operation of certain elements of the embodiment shown in FIG. 1. It is worthwhile to note, that the notation of a number or letter surrounded by a circle is used in these figures to indicate the order of processing the various routines of this embodiment. Transactions 107 show a protected memory area 110 and an SMM memory area 115. Protected mode memory area 110 includes an initialization routine 120, a return routine 130, an application 150, and a real time clock (RTC) entry 140. Preferable, protected mode memory area 110 also contains at least a portion of an operating system and various other application programs to be executed in the protected mode. SMM memory area 115 contains a first data area 160, an SMM routine 170, a second data area 180, a buffer data area 185, an RTC SMM service routine 190.

Figure 2:
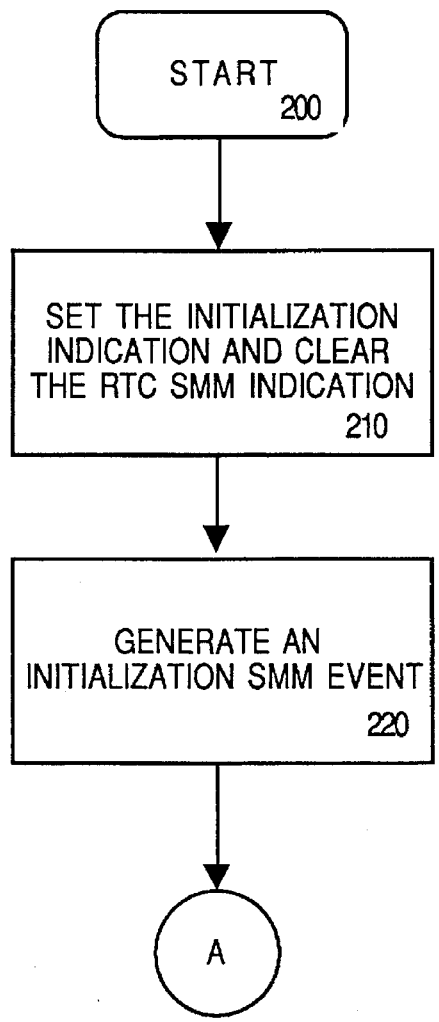
FIG. 2 shows a flow diagram illustrating the operation of initialization routine 120 according to one embodiment of the invention.

FIG. 2 shows a flow diagram illustrating the operation of initialization routine 120. The initialization routine 120 is executed in protected mode to initialize the invention. Preferably, initialization routine 120 is implemented as part of the system BIOS, and thus is executed during the booting (e.g., startup) of computer system 100. From block 200, flow passes to block 210.

At block 210, an initialization indication is set, an RTC SMM indication is cleared, and flow passes to block 220. Initialization routine 120 sets the initialization indication and clears the RTC SMM indication to indicate the next SMM event is an initialization SMM event.

At block 220, initialization routine 120 concludes by causing the initialization SMM event. This is accomplished by writing to an I/O address called APM_SMI Port.

Since initialization routine 120 concluded by causing the initialization SMM event in block 220, the processor suspends processing in the protected mode at the instruction stored at the location in memory directly following initialization routine 120 (i.e., the first instruction of return routine 130 which is stored at a predetermined location 125 as shown in FIG. 1). In addition, the processor switches into the SMM mode and stores in first data area 160 the return information to return to the processing instructions stored at predetermined location 125 (referred to herein as the "predetermined return information"). The processor then begins execution of SMM routine 170 as shown by line 1 in FIG. 1.

Predetermined location 125 is predetermined in the sense that initialization routine 120 will always cause the initialization SMM event to occur at the same location (i.e., block 220) in its code. Thus, the predetermined return information will always return the processor to the location of the first command in return routine 130. As a result, predetermined location 125 remains constant regardless of where in memory or on what system initialization routine 120 and return routine 130 is executed. In addition, predetermined location 125 is determined prior to any subsequent SMM events.

Figure 3:
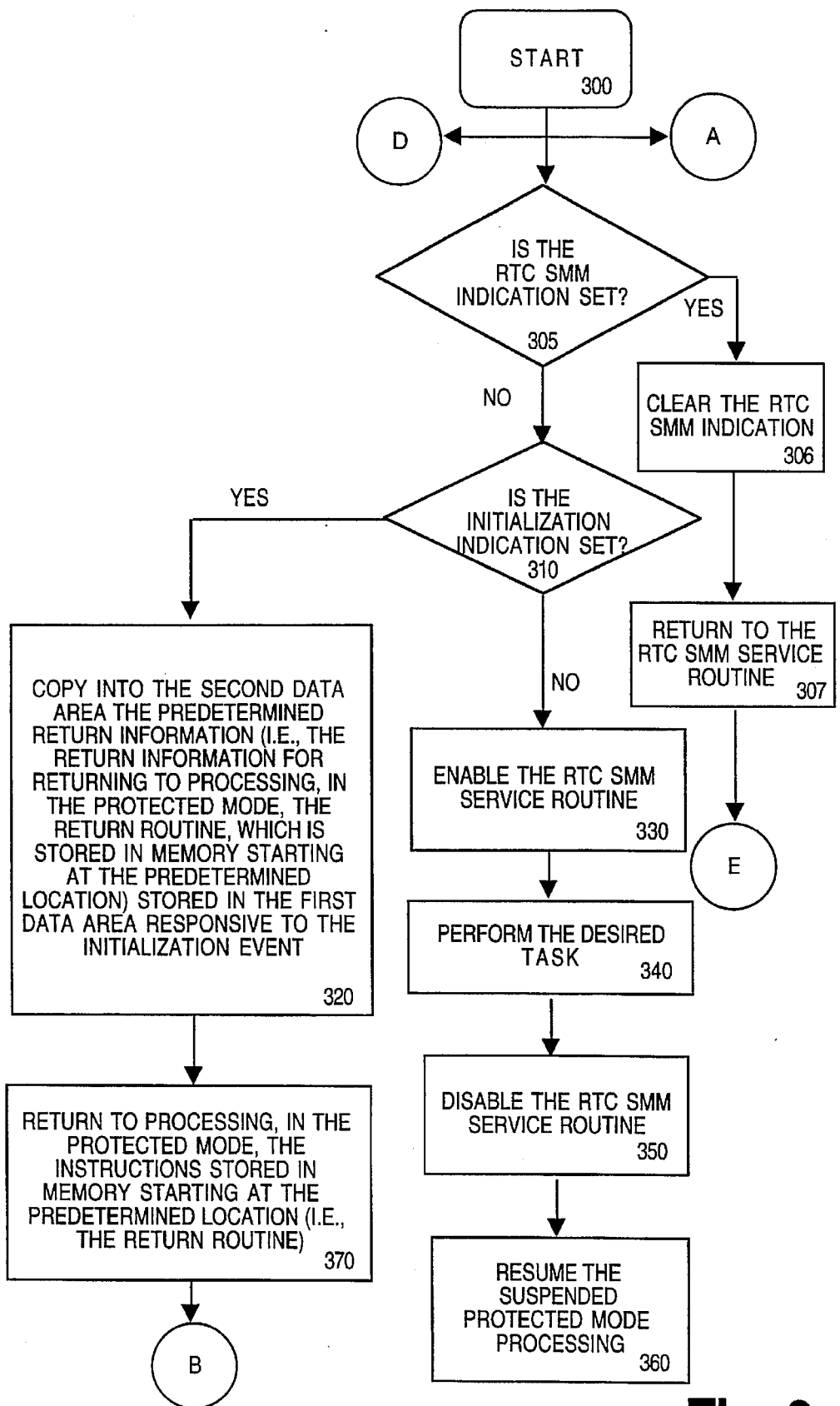
FIG. 3 shows a flow diagram illustrating the operation of SMM routine 170 according to one embodiment of the invention.

FIG. 3 shows a flow diagram illustrating the operation of SMM routine 170. SMM routine 170 is executed in the SMM mode. At block 305, the determination is made whether the RTC SMM indication indicates the current SMM event is a RTC SMM event (RTC SMM events will be further described later). If it is not a RTC SMM event, flow passes to block 310. Otherwise, flow passes to block 306. In the present example, the RTC SMM indication was cleared in step 210 indicating the current SMM event is not a RTC SMM event. As a result, flow passes to block 310.

As shown in block 310, the determination is made whether the initialization indication indicates the current SMM event is the initialization SMM event. If it is the initialization SMM event, flow passes to block 320. Otherwise, flow passes to block 330. In the present example, the initialization indication indicates the current event is the initialization SMM event. Alternative embodiments could use other methods of determining if the current event is the initialization SMM event. For example, an alternative embodiment could be implemented such that the first SMM event is always the initialization SMM event and SMM routine 170 stores an indication as to whether it has yet occurred.

At block 320, the predetermined return information stored in first data area 160 by the processor responsive to the initialization SMM event is copied into the second data area and flow passes to block 370. In the present example, SMM routine 170 copies the predetermined return information from first data area 160 into second data area 180.

As shown in block 370, SMM routine 170 causes the processor to return to processing in the protected mode. SMM routine 170 ends with the resume command. Upon executing the resume command, the processor uses the return information stored in first data area 160 (which is currently the predetermined return information) to return to processing in the protected mode. As a result, the processor switches to protected mode and resumes processing the instructions stored starting at predetermined location 125 (i.e., return routine 130) as shown by line 2 in FIG. 1.

Figure 4:
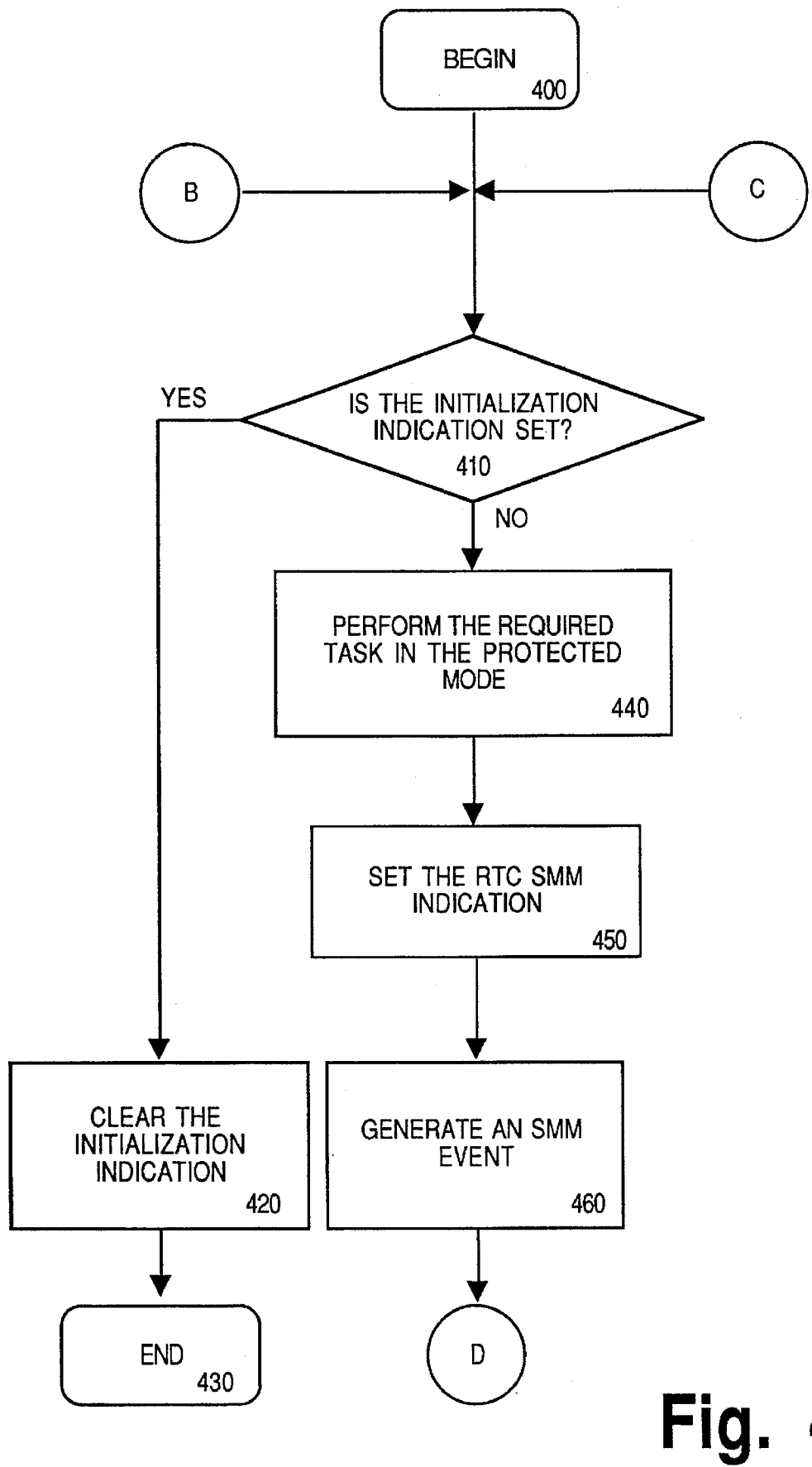
FIG. 4 shows a flow diagram illustrating the operation of return routine 130 according to one embodiment of the invention.

FIG. 4 shows a flow diagram illustrating the operation of return routine 130. At block 410, the determination is made whether the initialization indication indicates the processor is returning from servicing the initialization SMM event. If the processor is returning from servicing the initialization SMM event, flow passes to block 420. Otherwise, flow passes to block 440. In the present example, return routine 130 polls the initialization indication and it indicates the current SMM event is the initialization SMM event.

As shown in block 420, return routine 130 clears the initialization indication and flow passes to block 430.

At block 430, the return routine 130 ends and the processor continues to the next program to be executed. For example, application 150 will eventually be executed as shown by line 3 in FIG. 1.

During the subsequent execution of other programs in the protected mode (e.g., during the execution of application 150), additional SMM events will occur. Each of these SMM events will cause the processor to suspend processing in the protected mode at its current location, switch to the SMM mode, store in first data area 160 the return information to resume the protected mode processing, and execute SMM routine 170. To provide an example, FIG. 1 shows another SMM event occurs during the execution of application 150 which causes the processor to suspend the execution of application 150 at a current location 145, switch to the SMM mode, store in first data area 160 the return information (referred to herein as the "current return information") to resume the suspended processing of application 150, and begin executing SMM routine 170 again (as shown by line 4).

FIG. 3, as previously described, illustrates a flow diagram of SMM routine 170. With reference to step 305, the determination is again made whether the RTC SMM indication indicates the current SMM event is a RTC SMM event. If it is not a RTC SMM event, flow passes to block 310. Otherwise, flow passes to block 306. In the present example, the SMM RTC indication was cleared in step 210 indicating the current SMM event is not a RTC SMM event. As a result, flow passes to block 310.

As shown in block 310, the determination is again made whether the initialization indication indicates the current SMM event is the initialization SMM event as described above. If it is the initialization SMM event, flow passes to block 320. Otherwise, flow passes to block 330. In the present example, the initialization indication was cleared in step 420, and thus indicates the current event is not the initialization SMM event.

At block 330, RTC SMM service routine 190 is enabled and flow passes to block 340. It is well known that certain interrupts may be disabled or "masked". Each maskable interrupt is assigned a bit in an "interrupt mask" to indicate whether it is currently enabled or disabled. As previously described, each interrupt corresponds to an entry in the SMM interrupt table. RTC Entry 140 is the portion of memory used by the SMM interrupt table as the entry for the RTC interrupt. Since the interrupt mask and data stored in RTC Entry 140 must be altered to enable the RTC interrupt, the protected mode interrupt mask and protected mode data stored in RTC Entry 140 must be preserved for returning to the protected mode. Therefore, SMM routine 170 stores a copy of the protected mode data stored in RTC Entry 140 and the current protected mode interrupt mask in buffer data area 185 such that they may be restored upon completion of SMM routine 170. Then, SMM routine 170 stores the starting address of RTC SMM service routine 190 in RTC Entry 140 and sets the interrupt mask such that only the RTC interrupt is enabled. As a result, the processor, using the SMM's event handling mechanism, will execute RTC SMM service routine 190 in response to an RTC interrupt.

As shown in block 340, SMM routine 170 performs the tasks for which it was invoked and flow passes to block 350. This may be any number of tasks, including taking measures to conserve energy when a portable computer's lid is closed or after a specified period of time. Having enabled RTC SMM service routine 190 in step 330, the performance of step 340 may be interrupted at anytime by the occurrence of an RTC interrupt. In response to such an RTC interrupt, the SMM's event handling mechanism suspends execution of SMM routine 170 at its current location (shown in FIG. 1 as RTC interrupt location 175), stores the return information to resume the suspended execution of SMM routine 170, and causes the processor to execute RTC SMM service routine 190. Such an occurrence is shown by line 5 of FIG. 1.

FIG. 5a illustrates a portion of a flow diagram of RTC SMM service routine 190. At block 510, the current return information stored in first data area 160 (i.e., the return information for resuming the suspended protected mode execution of application 150) is copied into the buffer data area 185 and flow passes to block 520.

At block 520, the predetermined return information stored in second data area 180 is copied into first data area 160 and flow passes to block 530.

At block 530, the RTC SMM service routine 190 is disabled and flow passes to block 540. In the present example, SMM routine 170 performs the following: 1) sets the interrupt mask such that all interrupts are disabled; and 2) restores the original protected mode contents of RTC Entry 140 which were stored in step 330.

As shown in block 540, SMM routine 170 causes the processor to return to processing in the protected mode. In the present example, SMM routine 170 ends with the resume command. Upon executing the resume command, the processor uses the return information stored in first data area 160 (which is currently the predetermined return information) to return to processing in the protected mode. As a result, the processor switches to the protected mode and resumes processing the instructions stored starting at predetermined location 125 (i.e., return routine 130). This is shown by line 6 in FIG. 1. In this manner, the processor is caused to return to processing in the protected mode at a location other than current location 155, without altering any return information—i.e., using the return information previously generated by the processor. Thus, regardless of the model of the processor, the mode in which the SMM event occurred, or the complexity of the return information, the current information is correct.

FIG. 4, as previously described, illustrates a flow diagram of return routine 130. Returning again to block 410, the determination is made whether the initialization indication is set, thus, indicating the processor is returning from servicing the initialization SMM event. If the processor is returning from servicing the initialization SMM event, flow passes to block 420. Otherwise, flow passes to block 440. In the present example, the bit used to store the initialization indication was previously cleared in step 420, and thus does not indicate the current SMM event is the initialization SMM event.

As shown in block 440, any tasks requiring the resources of the protected mode are performed and flow passes to block 450. In one embodiment, one such task is to use the protected mode's event handling mechanism to service any protected mode events that were received while in SMM. To accomplish this, return routine 130 disables all undesired interrupts (including the RTC interrupt) and enters a delay loop which keeps the processor in the protected mode for a predetermined amount of time. While in the protected mode, any events that have occurred will cause the processor to suspend return routine 130 to service these events using the protected mode's event handling mechanism. In alternative embodiments, the return routine 130 could be implemented to cause the processor to remain in the protected mode using any number of techniques. For example, return routine 130 could be implemented to continually read the status registers of devices which generate events of the type desired to be processed and return to the SMM mode when they all indicate they do not require service.

At block 450, the RTC SMM indication is set and flow passes to block 460. Thus, the RTC SMM indication will indicate to SMM routine 170 that the next SMM event is an RTC SMM event.

At block 460, the return routine 130 causes an SMM event. This is accomplished in the same manner as in block 220.

In response to the RTC SMM event generated in block 460, the processor suspends processing in the protected mode, switches to the SMM, and stores the return information in first data area 160. It is important to note that this return information is not used in this embodiment because there is no need to return to the end of the return routine 130. The processor then begins execution of SMM routine 170 again. This is shown by line 7 in FIG. 1.

FIG. 3, as previously described, illustrates a flow diagram of SMM routine 171). Returning again to block 305 of FIG. 3, the determination is made whether the RTC SMM indication indicates the current SMM event is an RTC SMM event. If it is not an RTC SMM event, flow passes to block 310. Otherwise, flow passes to block 306. In the present example, the RTC SMM indication was set in step 450, and thus indicates the current SMM event is an RTC SMM event. As a result, flow passes to block 306.

As shown in block 306, the RTC SMM indication is cleared and flow passes to block 307.

As block 307, SMM routine 170 causes the processor to return to processing RTC SMM service routine 190. Since RTC SMM service routine 190 is stored starting at a known location in SMM memory area 115, the location in memory storing the previously executed resume instruction in RTC SMM service routine 190 (represented by block 540) is known. SMM routine 170 causes the processor to resume execution of RTC SMM service routine 190 at the instruction following this resume instruction (i.e., location 195) as shown by line 8 of FIG. 1. In this manner, the processor returns to executing the RTC SMM service routine 190 at block 550.

FIG. 5b illustrates the remainder of a flow diagram of RTC SMM service routine 190. At block 550, the current return information (i.e., the return information for resuming the suspended protected mode processing of application 150) stored in first data area 160 is copied into second data area 180 and flow passes to block 560.

As shown in block 560, the RTC SMM service routine 190 is enabled and flow passes to block 570. To enable the RTC SMM service routine 190, SMM routine 170 replaces the protected mode data previously stored in buffer data area 185 in step 330 (i.e., the previous protected mode contents of RTC Entry 140) with a copy of the current protected mode data stored in RTC Entry 140, such that the current protected mode data may be restored upon completion of SMM routine 170. Then, SMM routine 170 stores the starting address of RTC SMM service routine 190 in RTC Entry 140 and sets the interrupt mask such that only the RTC interrupt is enabled. As a result, the processor, using the SMM's event handling mechanism, will execute RTC SMM service routine 190 in response to another RTC interrupt.

At block 570, the RTC SMM service routine 190 causes the processor to return to processing SMM routine 170. In one embodiment, RTC SMM service routine 190 ends in an "interrupt return" command (i.e., "IRET"). Upon executing the interrupt return command, the processor resumes processing of SMM routine 170 at RTC interrupt location 175 as shown by line 9 of FIG. 1. Thus, the processor resumes the processing represented by step 340 of FIG. 3.

FIG. 3, as previously described, illustrates a flow diagram of SMM routine 170. Returning to step 340, the processor resumes execution of SMM routine 170 to continue performing the task for which the SMM mode was invoked. Having again enabled RTC SMM service routine 190 in step 560, the performance of step 340 may again be interrupted at anytime by the occurrence of an RTC interrupt as previously described. Upon completion of the task for which the SMM mode was invoked, flow passes form block 340 to block 350.

At block 350, RTC SMM service routine 190 is disabled and flow passes to block 360. In the presblock 360. In the present example, SMM routine 170 performs the following: 1) restores the protected mode interrupt mask stored in step 330; and 2) restores the most recent protected mode data contents of RTC Entry 140 stored in the later of blocks 330 and 560.

As shown in block 360, SMM routine 170 causes the processor to resume the suspended protected mode processing of application 150 at current location 145. SMM routine 170 ends with the resume command. Upon executing the resume command, the processor uses the return information stored in first data area 160 (which is currently the current return information) to return to processing in the protected mode at current location 145. Thus, the processor returns to the location in memory where the SMM event occurred as shown by line 10 of FIG. 1.

Overview

It is thought worthwhile to provide an overview of the order of execution of the various routines. To begin, the initialization routine sets the initialization indication and concludes by generating an initialization SMM event. In response to the initialization SMM event, the processor switches to the SMM mode and begins executing SMM routine 170 as shown by line 1 of FIG. 1. Since the initialization indication indicates the current event is the initialization SMM event, SMM routine 170 stores the predetermined return information for later use, and returns to the protected mode to execute return routine 130 using the resume command as shown by line 2.

During subsequent protected mode processing (e.g., application 150), another SMM event occurs. In response to this SMM event, the processor suspends the execution of application 150, switches to the SMM mode, stores the current return information for resuming execution of application 150, and again begins processing SMM routine 170 as shown by line 4. As a result, SMM routine 170 has two sets of return information available. In response to an RTC interrupt, the processor suspends the execution of SMM routine 170 to execute RTC SMM service routine 190 as shown by line 5. RTC SMM service routine 190 causes the processor to return to the protected mode to execute return routine 130 using the predetermined return information and a resume command as shown by line 6. Return routine 130, for example, allows for the servicing of protected mode events using the protected mode's event handling mechanism. Return routine 130 sets an RTC SMM indication and concludes by causing an SMM event. In response to the SMM event, the processor begins executing SMM routine 170 again starting at its initial instruction as shown by line 7. Since the RTC SMM indication indicates the current SMM event is an RTC SMM event, SMM routine 170 causes the processor to resume processing the RTC SMM service routine 190 as shown by line 8. RTC SMM service routine 190 causes the processor to resume the suspended execution of SMM routine 170 using an interrupt return command as shown by line 9. SMM routine 170 concludes by causing the processor to resume execution of application 150 using the current return information and a resume command as shown by line 10.

In this manner, SMM routine 170 may return to processing, in the protected mode, instructions starting at a predetermined location in memory without altering the contents of any return information.

Alternative Embodiments

Although the invention has been described in terms of several embodiments, many other alternative embodiments are possible. For example, rather than using the RTC interrupt to periodically return to the protected mode, SMM routine 170 could be implemented such that it has calls to a routine like RTC SMM service routine 190 interspersed at appropriate intervals in its code. In this example, the steps necessary to use the RTC event would be removed. As a second example, the predetermined return information could be stored by the initialization routine without the use of an initialization SMM event (e.g., the predetermined return information could be stored by the initialization routine at a known location in the protected mode memory area such that SMM routine 170 could access it). As another example, the storage of the predetermined return information could be implemented in hardware such that: 1) the processor has a separate event for initialization of the invention; or 2) the processor can recognize which SMM event is the initialization SMM event. In addition, the above mentioned hardware may cause the processor to store the predetermined return information without switching to the SMM mode. As another example, the interrupt used to suspend the execution of SMM routine 170 could be any of the other interrupts available in the SMM. As another example, the initialization SMM event could be caused such that processing is interrupted at an instruction stored at a location near predetermined location 125. As a result, the processor would store what is referred to herein as "temporary return information." This temporary return information could be altered into the predetermined return information and used as previously described. Although this embodiment requires alteration of the temporary return information, it would require less alteration than altering the current return information because: 1) the current return information most likely changes for each SMM event, while the temporary return information remains constant; 2) the contents of the temporary return information would be closer to that of the predetermined return information because the initialization SMM event was caused such that processing was interrupted at an instruction stored at a location near predetermined location 125; and 3) the temporary return information only needs to be altered once as opposed to altering the current return information upon the occurrence of each SMM event. As another example, the initialization SMM event could be caused when the processor is in a known state or mode. As a result, the processor would store what is referred to herein as "known state return information." This known state return information could be altered to achieve a desired result and stored in the same manner as the predetermined return information. Although this embodiment requires alteration of the temporary return information, it would require less alteration than altering the current return information because: 1) the current return information most likely changes for each SMM event, while the temporary return information remains constant; and 2) the temporary return information only needs to be altered once as opposed to altering the current return information upon the occurrence of each SMM event.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. In a computer system including a processor operable in a first mode and a second mode, said processor being coupled to a storage device storing a plurality of instructions, a method for switching between said first mode and said second mode of said processor, said method comprising the steps of:

A) storing, in response to a first interrupt, a first information in said storage device for switching to processing in said first mode starting at a first of said plurality of instructions;

B) switching from processing air at a second of said plurality of instructions in said first mode to processing in said second mode in response to a second interrupt occurring subsequent to said storing in step A;

C) storing, in response to said second interrupt, a second information in said storage device for returning to processing in said first mode starting at said second of said plurality of instructions; and D) switching from processing in said second mode to processing in said first mode starting at said first instruction using said first information if processing starting at said first instruction is required, said switching in step D occurring in response to said switching in step B.

2. The method of claim 1, said method further comprising the step of causing said first interrupt as part of an initialization process.

3. The method of claim 2, wherein said step of storing said first information further comprises the steps of:

A1) switching from processing in said first mode to processing in said second mode;

A3) storing said first information in said storage device; and

A2) switching from processing in said second mode to processing in said first mode starting at said first instruction using said first information, said switching in step A2 occurring in response to said switching in step A1.

4. The method of claim 1, wherein said storage device contains a second mode data area accessible only while operating in said second mode, wherein said step of storing said first information further comprises the step of storing said first information in said second mode data area; and wherein said step of storing said second information further comprises the step of storing said second information in said second mode data area.

5. The method of claim 1, wherein said step of storing said first information occurs at a preceding instruction execution boundary of said first instruction; and wherein said switching in step B occurs at a preceding instruction execution boundary of said second instruction.

6. The method of claim 1, wherein said step of storing said first information further includes the step of storing said first information in a second data area in said storage device, wherein said step of storing said second information further includes the step storing said second information in a first data area in said storage device.

7. The method of claim 1, wherein said step of storing said first information further comprises the steps of:

A1) storing a third information in a first data area in said storage device;

A2) switching from processing in said first mode to processing in said second mode;

A3) executing a portion of said plurality of instructions in said second mode which causes said processor to store said first information in a second data area in said storage device, wherein said first information corresponds to and is determined from said third information; and A4) switching from processing in said second mode to processing in said first mode starting at said first instruction using said first information, said switching in step A4 occurring in response to said switching in step A2; and wherein said step of storing said second information further comprises the step of storing said second information in said first data area.

8. The method of claim 1, wherein said second mode is a system management mode.

9. In a computer system including a processor operable in a first mode and a second mode, said processor being coupled to a storage device, a method for switching between said first mode and said second mode of said processor, said method comprising the steps of:

A) storing, in response to a first interrupt, a first information in said storage device for switching to said first mode to process a first routine, wherein said first routine is stored in said storage device;

B) switching from processing a second routine in said first mode to processing a third routine in said second mode in response to a second interrupt occurring subsequent to said step of storing said first information, wherein said second routine and said third routine are stored in said storage device;

C) storing, in response to said second interrupt, a second information in said storage device for resuming processing of said second routine in said first mode; and D) switching from said second mode to said first mode to process said first routine using said first information if processing said first routine is required, said switching in step D occurring in response to said switching in step B.

10. The method of claim 9, said method further comprising the step of executing a fourth routine which causes said first interrupt, wherein said fourth routine is stored in said storage device.

11. The method of claim 10, wherein said step of storing said first information further comprises the steps of:
A1) switching from processing in said first mode to processing in said second mode;
A2) storing said first information in said storage device; and
A3) switching from said second mode to said first mode to process said first routine using said first information, said switching in step A3 occurring in response to said switching in step A1.

12. The method of claim 9, wherein said storage device contains a second mode data area accessible only while operating in said second mode, wherein said step of storing said first information further comprises the step of storing said first information in said second mode data area; and wherein said step of storing said second information further comprises the step of storing said second information in said second mode data area.

13. The method of claim 9, wherein said step of storing said first information further comprises the steps of:
A1) storing a third information in a first data area in said storage device;
A2) switching from processing in said first mode to processing in said second mode;
A3) executing said third routine in said second mode which causes said processor to store said first information in a second data area in said storage device, wherein said first information is determined from and corresponds to said third information; and
A4) switching from said second mode to said first mode to process said first routine using said first information, said switching in step A4 occurring in response to said switching in step A2; and
wherein said step of storing said second information further comprises the step of storing said second information in said first data area.

14. The method of claim 9, wherein said second mode is a system management mode.

15. A method for transitioning between modes of a processor, said method comprising the computer implemented steps of:
storing a first return information for returning to execution at a first location in a normal operating mode in response to performing a first transition from the normal operating mode to a different operating mode;
returning to the normal operating mode from the first transition;
performing a second transition from executing at a second location in the normal operating mode to the different operating mode; and
returning to the normal operating mode from the second transition using the first return information.

16. The method of claim 15 further comprising the step of:
storing a second return information for returning to execution at said second location in said normal operating mode in response to performing said second transition.

17. The method of claim 16 further comprising the step of:
in response to returning to said normal operating mode from said second transition using said first return information, handling an event that was generated while in said different operating mode, wherein said event can only be handled in said normal operating mode;
performing a third transition from the normal operating mode to the different operating mode; and
returning to executing at said second location in the normal operating mode from the third transition using the second return information.

18. The method of claim 15, wherein said different operating mode is transparent to said normal operating mode.

19. The method of claim 15, wherein said different operating mode used for reducing power consumption.

20. The method of claim 15, wherein said step of storing said first return information further includes the step of storing said first return information in an area of memory accessible only while operating in said different operating mode.

21. The method of claim 15 further comprising the step of:
performing said first transition from executing at said first location in the normal operating mode.

22. In a computer system having a processor operable in at least a first and second mode, said second mode having a first memory area reserved for storing data used to return to said first mode, a method comprising the computer implemented steps of:
storing in a second memory area a first return information for returning to execution at a first location in said first mode in response to performing a first transition from the first mode to the second mode;
returning to the first mode from the first transition using data in said first memory area;
performing a second transition from executing at a second location in the first mode to the second mode;
copying said first return information from said second memory area into said first memory area; and
returning to the first mode from the second transition using the first return information.

23. The method of claim 22 further comprising the step of:
storing in said first memory area a second return information for returning to execution at said second location in said first mode in response to performing said second transition and prior to said step of copying.

24. The method of claim 22 further comprising the step of:
storing in a third memory area a second return information for returning to execution at said second location in said first mode in response to performing said second transition and prior to returning to said first mode from the second transition;
in response to returning to said first mode from said second transition using said first return information, handling an event that was generated while operating in said second mode;
performing a third transition from the first mode to the second mode; and
returning to executing at said second location in the first mode from the third transition using the second return information.

25. The method of claim 22, wherein said second mode is transparent to said first mode.

26. The method of claim 22, wherein said second mode is used for reducing power consumption.

27. The method of claim 22, wherein said first and second memory areas are accessible only while operating in said second mode.

28. The method of claim 22 further comprising the step of:

performing said first transition from executing at said first location in the first mode.

29. The method of claim 22, wherein said step of storing said first return information for returning to execution at said first location in said first mode in response to performing said first transition from the first mode to the second mode includes the steps of:

storing in said first memory area said first return information in response to performing said first transition; and copying said first return information from said first memory area into said second memory area.

30. The method of claim 22, wherein said step of storing said first return information for returning to execution at said first location in said first mode in response to performing said first transition from the first mode to the second mode includes the steps of:

receiving a signal while operating in said first mode, said signal directing the processor to transition to said second mode;

invoking circuitry and/or microcode in the processor to perform the first transition and store said first return information in said first memory area; and copying said first return information from said first memory area into said second memory area in response to executing a routine in said second mode.

31. A computer system comprising:

a processor that in response one type of interrupt transitions from a first mode to a second mode and stores return information in a first memory area for resuming execution in said first mode, wherein said first memory area is reserved for storing data for transitioning back to said first mode; and a storage device coupled to said processor having stored therein a plurality of instructions embodying the logic for causing the processor to, store in a second memory area a first return information for returning to execution at a first location in said first mode in response to performing a first transition from the first mode to the second mode;

return to the first mode from the first transition;

copy the first return information from the second memory area into the first memory area in response to performing a second transition from executing at a second location in the first mode to executing in the second mode; and return to the first mode from the second transition using the first return information.

32. The computer system of claim 31, wherein said second mode is transparent to said first mode.

33. The computer system of claim 31, wherein said second mode is used for reducing power consumption.

34. The computer system of claim 31, wherein said first and second memory areas are accessible only while operating in said second mode.

* * * * *